United States Patent
Chae et al.

(10) Patent No.: US 11,833,903 B2
(45) Date of Patent: Dec. 5, 2023

(54) HYBRID POWER TRAIN OF VEHICLE

(71) Applicants: Hyundai Motor Company, Seoul (KR); Kia Corporation, Seoul (KR)

(72) Inventors: Min Ho Chae, Icheon (KR); Jae Wan Choi, Anyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/946,615

(22) Filed: Sep. 16, 2022

(65) Prior Publication Data

US 2023/0294504 A1    Sep. 21, 2023

(30) Foreign Application Priority Data

Mar. 16, 2022  (KR) .......................... 10-2022-0032837

(51) Int. Cl.
| | |
|---|---|
| *B60K 6/52* | (2007.10) |
| *B60K 6/445* | (2007.10) |
| *B60K 6/365* | (2007.10) |
| *B60K 6/26* | (2007.10) |
| *B60K 6/547* | (2007.10) |

(52) U.S. Cl.
CPC ................ *B60K 6/445* (2013.01); *B60K 6/26* (2013.01); *B60K 6/365* (2013.01); *B60K 6/52* (2013.01); *B60K 6/547* (2013.01)

(58) Field of Classification Search
CPC .......... B60K 6/445; B60K 6/26; B60K 6/365; B60K 6/52; B60K 6/547; F16H 49/005
See application file for complete search history.

(56) References Cited

U.S. PATENT DOCUMENTS

| | | | |
|---|---|---|---|
| 8,358,044 B2 | 1/2013 | Waszak et al. | |
| 2010/0038159 A1* | 2/2010 | Jinno | B60W 10/115 180/65.265 |
| 2010/0049390 A1* | 2/2010 | Supina | F16H 3/727 180/65.265 |
| 2017/0040880 A1* | 2/2017 | Ando | H02K 49/102 |
| 2019/0202278 A1* | 7/2019 | Kim | B60K 6/445 |
| 2019/0255942 A1* | 8/2019 | Ling | B60W 20/00 |
| 2020/0309005 A1* | 10/2020 | Yonezawa | F02D 41/027 |
| 2021/0046815 A1* | 2/2021 | Farha | B60K 6/28 |
| 2022/0009478 A1 | 1/2022 | Chae et al. | |
| 2022/0041156 A1* | 2/2022 | Imamura | B60K 6/445 |
| 2022/0128130 A1* | 4/2022 | Mushiga | F16H 7/0829 |

FOREIGN PATENT DOCUMENTS

| | | |
|---|---|---|
| CN | 102975609 A | 3/2013 |
| JP | 2010-148233 | 7/2010 |
| JP | 2014-017983 | 1/2014 |
| KR | 10-1537046 | 7/2015 |
| KR | 10-1701824 | 2/2017 |
| KR | 10-2021-0086187 | 7/2021 |
| KR | 10-2021-0152286 | 12/2021 |
| KR | 10-2022-0007312 | 1/2022 |

\* cited by examiner

*Primary Examiner* — Jacob S. Scott
*Assistant Examiner* — Farhana Pervin
(74) *Attorney, Agent, or Firm* — MORGAN, LEWIS & BOCKIUS LLP

(57) ABSTRACT

A hybrid powertrain of a vehicle, includes an input shaft provided concentric with an engine rotation shaft, a coaxial magnetic gear device provided to connect the engine rotation shaft to the input shaft, a differential device constantly connected to the input shaft, a first motor constantly connected to the engine rotation shaft, and a second motor continuously engaged to the differential device.

12 Claims, 8 Drawing Sheets

FIG. 3

| CROSS SECTION OF CORE OF COAXIAL MAGNETIC GEAR | EV MODE | FIRST STAGE OF PARALLEL | SECOND STAGE OF PARALLEL |
|---|---|---|---|
| Ni, Npp, No | 0/4/0 | 1/4/3 | 2/4/2 |
| FIXING of POLE PIECE | · NO GEAR RATIO<br>· RELEASE OF MECHANICAL CONNECTION | GEAR RATIO OF 3 | GEAR RATIO OF 1 |
| FIXING OF OUTER ROTOR | · NO GEAR RATIO<br>· RELEASE OF MECHANICAL CONNECTION | GEAR RATIO OF 4 | GEAR RATIO OF 2 |

HYBRID POWER TRAIN OF VEHICLE

CROSS REFERENCE TO RELATED APPLICATION

The present application claims priority to Korean Patent Application No. 10-2022-0032837 filed on Mar. 16, 2022, the entire contents of which is incorporated herein for all purposes by this reference.

BACKGROUND OF THE PRESENT DISCLOSURE

Field of the Present Disclosure

The present disclosure relates to a technology of a structure of a hybrid powertrain of a vehicle.

Description of Related Art

A hybrid powertrain properly combines power of an internal combustion engine with power of an electric motor driven by electricity to allow an engine to be operated at a more efficient operating point, achieving improvement of fuel efficiency of a vehicle and reducing harmful exhaust substances so that a more eco-friendly vehicle may be configured.

The hybrid powertrain of a vehicle implements as various driving modes with a configuration as simple as possible and that unnecessary drag is minimized.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hybrid powertrain of a vehicle, which is configured for implementing various driving modes with a simple configuration and allowing an efficient vehicle driving by minimizing drag.

According to one aspect, there is provided a hybrid powertrain of a vehicle, which includes an input shaft provided concentric with an engine rotation shaft, a coaxial magnetic gear device provided to connect the engine rotation shaft to the input shaft, a differential device constantly connected to the input shaft, a first motor constantly connected to the engine rotation shaft, and a second motor continuously engaged to the differential device.

The coaxial magnetic gear device may have three rotation elements including an internal rotor, a pole piece, and an external rotor, and among the three rotation elements, one may be fixed, another may be connected to the engine rotation shaft, and the remaining one may be connected to the input shaft.

The first motor may be directly connected to the engine rotation shaft.

The first motor may be connected to the engine rotation shaft through an external gear pair.

A rotation shaft of the second motor may be provided parallel to the input shaft, and the second motor may be coupled to the differential device through one or more external gear pairs.

An internal rotor of the coaxial magnetic gear device may be connected to the engine rotation shaft, the pole piece may be connected to the input shaft, and the external rotor may be fixed to a housing.

The first motor may be directly connected to the engine rotation shaft, a first gear may be provided on the rotation shaft of the second motor, the input shaft may be provided with a second gear and a third gear which are engaged with the first gear to form an external gear pair, a through-shaft passing through the second motor may be provided, and the through-shaft may be provided with a fourth gear engaged with the third gear to form an external gear pair and a fifth gear engaged with a ring gear of the differential device to form an external gear pair.

The first motor may be directly connected to the engine rotation shaft, a first gear may be provided on the rotation shaft of the second motor, and the input shaft may be provided with a second gear engaged with the first gear to form an external gear pair and a third gear engaged with the ring gear of the differential device to form an external gear pair.

A first gear may be provided on the engine rotation shaft, a rotation shaft of the first motor may be provided with a second gear engaged with the first gear, a third gear may be provided on the rotation shaft of the second motor, an intermediate shaft may be provided concentric with the rotation shaft of the first motor, and the intermediate shaft may be provided with a fourth gear engaged with the third gear to form an external gear pair and a fifth gear engaged with a ring gear of the differential device to form an external gear pair.

The input shaft may be provided with a sixth gear engaged with the fourth gear of the intermediate shaft.

An internal rotor of the coaxial magnetic gear device may be connected to the engine rotation shaft, the pole piece may be fixed to a housing, and the external rotor may be connected to the input shaft.

The first motor may be directly connected to the engine rotation shaft, a first gear may be provided on the rotation shaft of the second motor, and the input shaft may be provided with a second gear engaged with the first gear to form an external gear pair and a third gear engaged with the ring gear of the differential device to form an external gear pair.

A first gear may be provided on the engine rotation shaft, a rotation shaft of the first motor may be provided with a second gear engaged with the first gear, the rotation shaft of the second motor may be provided with a third gear engaged with the ring gear of the differential device to form an external gear pair, a fourth gear may be provided on the input shaft, and the rotation shaft of the second motor may be provided with a fifth gear engaged with the fourth gear.

A first gear may be provided on the engine rotation shaft, a rotation shaft of the first motor may be provided with a second gear engaged with the first gear, a third gear may be provided on the rotation shaft of the second motor, an intermediate shaft may be provided concentric with the rotation shaft of the first motor, and the intermediate shaft may be provided with a fourth gear engaged with the third gear to form an external gear pair and a fifth gear engaged with a ring gear of the differential device to form an external gear pair.

The input shaft may be provided with a sixth gear engaged with the ring gear of the differential device.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 is a diagram for describing an operation of the coaxial magnetic gear device when the powertrain of the present disclosure implements an electric vehicle (EV) mode and a parallel mode;

Figure 1:
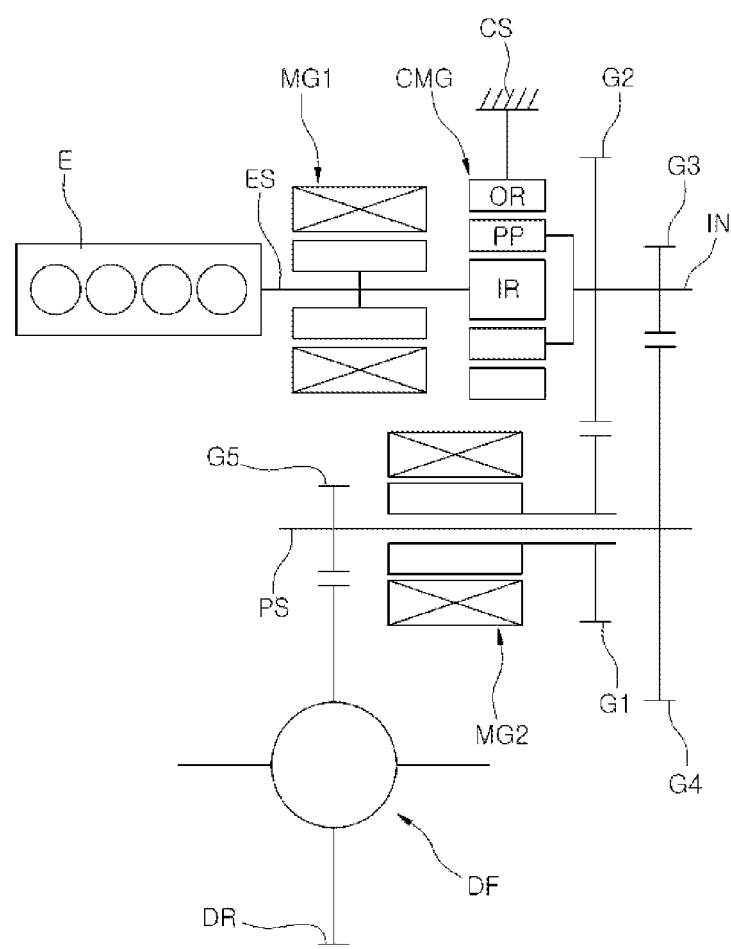
FIG. 1 is a diagram illustrating various exemplary embodiments of a hybrid powertrain of a vehicle according to the present disclosure.
Figure 2:
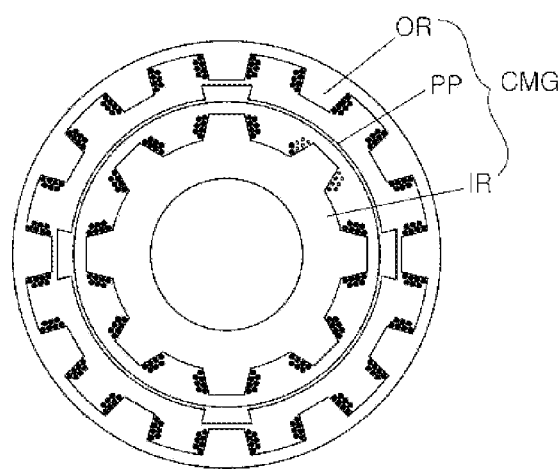
FIG. 2 is a diagram for describing a configuration of a coaxial magnetic gear device used in the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural and functional descriptions of the embodiments of the present disclosure disclosed in the present disclosure or application are illustrative only for the purpose of describing the embodiments, and the exemplary embodiments of the present disclosure may be implemented in various forms and should not be construed as being limited to exemplary embodiments described in the present disclosure or application.

The exemplary embodiments of the present disclosure may be variously modified and may have various forms, so that specific embodiments will be illustrated in the drawings and be described in detail in the present disclosure or application. It should be understood, however, that it is not intended to limit the embodiments according to the concept of the present disclosure to specific disclosure forms, but it includes all modifications, equivalents, and alternatives falling within the spirit and scope of the present disclosure.

The terms first, second, and/or the like may be used to describe various components, but the components should not be limited by these terms. These terms may be used only for the purpose of distinguishing one component from another component, and for example, a first component may be referred to as a second element, and similarly, the second component may also be referred to as the first component without departing from the scope of the present disclosure.

When a component is referred to as being "connected," or "coupled" to another component, it may be directly connected or coupled to another component, but it should be understood that yet another component may exist between the component and another component. On the other hand, when a component is referred to as being "directly connected" or "directly coupled" to another, it should be understood that yet another component may not be present between the component and another component. Other expressions describing the relationship between components, that is, "between" and "immediately between," or "adjacent to" and "directly adjacent to" should also be construed as described above.

Terms used herein is used only for the purpose of describing specific embodiments and are not intended to limit the present disclosure. Unless the context clearly dictates otherwise, the singular form includes the plural form. In the present specification, the terms "comprising," "having," or the like are used to specify that a feature, a number, a step, an operation, a component, an element, or a combination thereof described herein is present, and it should be understood that the terms do not preclude the presence or addition of one or more other features, numbers, steps, operations, components, elements, or combinations thereof.

Unless defined otherwise, all terms including technical or scientific terms used herein have the same meaning as commonly understood by those skilled in the art to which the present disclosure pertains. General terms that are defined in a dictionary shall be construed to have meanings that are consistent in the context of the relevant art and will not be interpreted as having an idealistic or excessively formalistic meaning unless clearly defined in the exemplary embodiment of the present disclosure.

Hereinafter, various exemplary embodiments of the present disclosure will be described in detail with reference to the accompanying drawings. Like reference numerals denote like members throughout the drawings.

Referring to FIG. 1, FIG. 2, FIG. 3, FIG. 4, FIG. 5, FIG. 6, FIG. 7, and FIG. 8, embodiments of a hybrid powertrain of a vehicle according to an exemplary embodiment of the present disclosure commonly include an input shaft IN provided concentrically with an engine rotation shaft ES of engine E, a coaxial magnetic gear device CMG provided to connect the engine rotation shaft ES to the input shaft IN, a differential device DF constantly connected to the input shaft IN, a first motor MG1 constantly connected to the engine rotation shaft ES, and a second motor MG2 constantly connected to the differential device DF.

That is, according to an exemplary embodiment of the present disclosure, power of the engine E may be shifted through the coaxial magnetic gear device CMG and transmitted to the input shaft IN, power of the input shaft IN may be transmitted to a driving wheel through the differential device DF, and the second motor MG2 may be constantly connected to the differential device DF to drive the differential device DF together with the power of the engine E transmitted to the input shaft IN.

Furthermore, in a state in which the first motor MG1 is constantly connected to the engine E, because the first motor MG1 may be mechanically separated from the input shaft IN and the differential device DF by the coaxial magnetic gear device CMG, a series mode may be implemented by driving the engine E and the first motor MG1 independently of the input shaft IN and the differential device DF, and when traveling in an electric vehicle (EV) mode by the second motor MG2, the drag due to the engine E and the first motor MG1 may be completely removed.

The coaxial magnetic gear device CMG is provided with three rotation elements including an internal rotor IR, a pole piece PP, and an external rotor OR, and among the three rotation elements, one is fixed, another is connected to the engine rotation shaft ES, and the remaining one is connected to the input shaft IN.

That is, in the various exemplary embodiments of the present disclosure in FIGS. 1 to 5, the internal rotor IR of the coaxial magnetic gear device CMG is connected to the engine rotation shaft ES, the pole piece PP is connected to the input shaft IN, and the external rotor OR is fixed to a housing CS.

Figure 6:
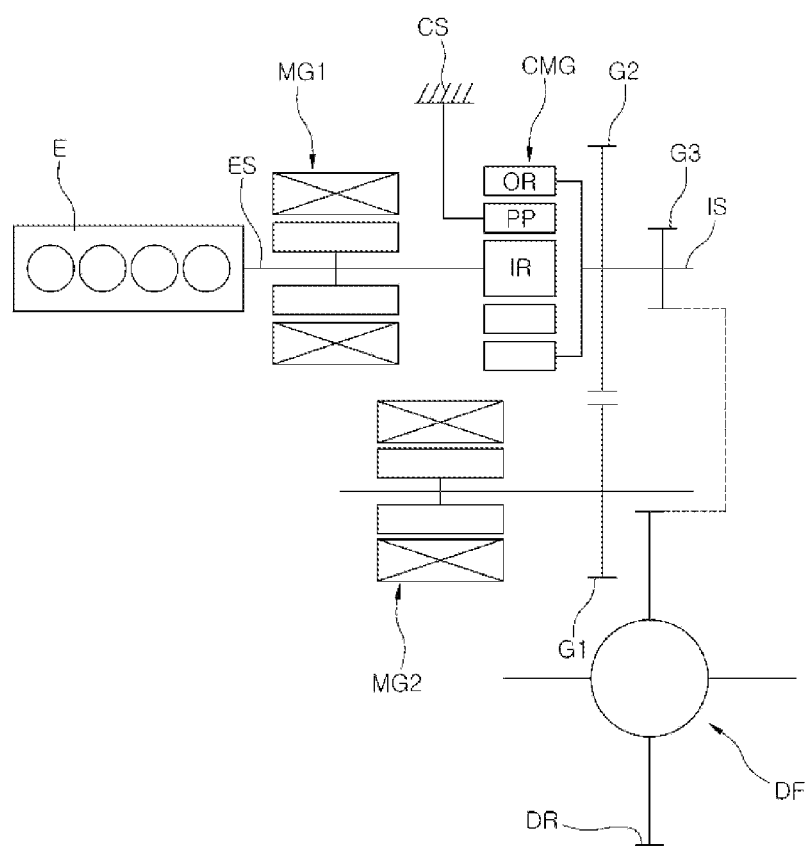
FIG. 6 is a diagram illustrating various exemplary embodiments of a hybrid powertrain of a vehicle according to the present disclosure.
Figure 7:
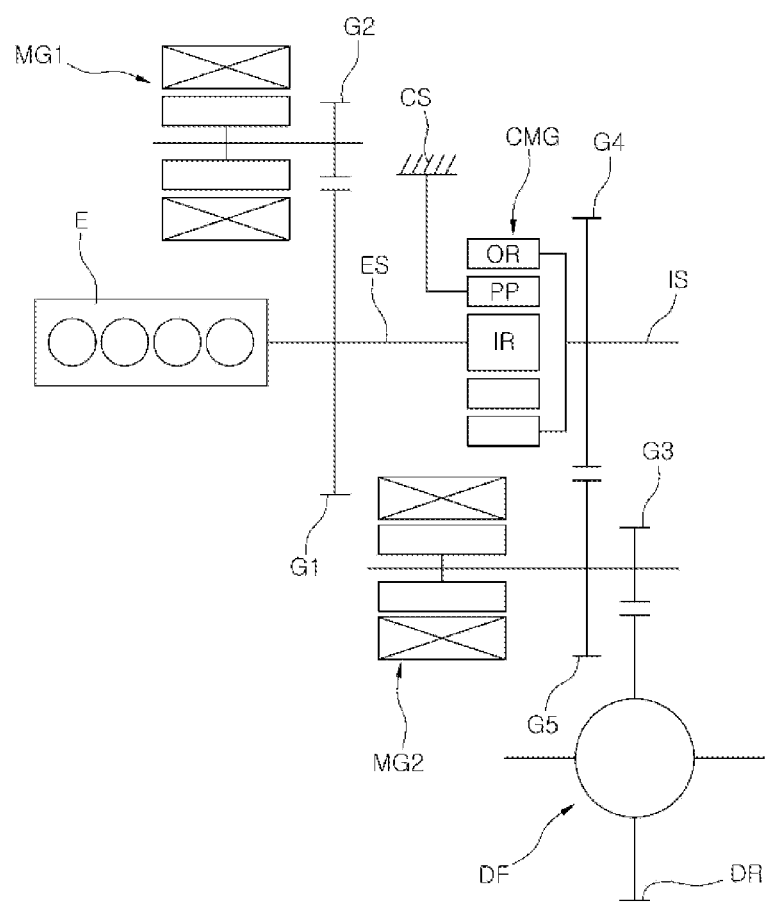
FIG. 7 is a diagram illustrating various exemplary embodiments of a hybrid powertrain of a vehicle according to the present disclosure.
Figure 8:
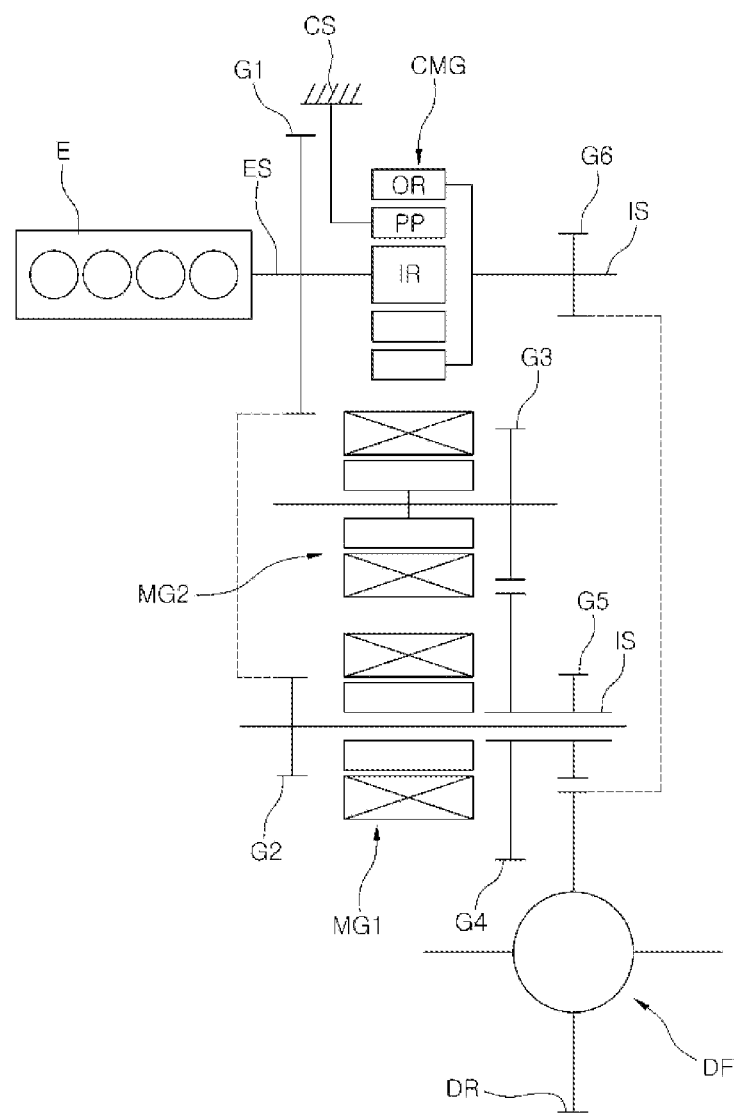
FIG. 8 is a diagram illustrating various exemplary embodiments of a hybrid powertrain of a vehicle according to the present disclosure.

Alternatively, in the various exemplary embodiments of FIGS. 6-8 of the present disclosure, the internal rotor IR of the coaxial magnetic gear device CMG is connected to the engine rotation shaft ES, the pole piece PP is fixed to the housing CS, and the external rotor OR is connected to the input shaft IN.

For reference, in the coaxial magnetic gear device CMG, when the number of pole pairs of the internal rotor IR is Ni, the number of pole pairs of the external rotor OR is No, and the number of pole piece PP is Npp, a condition of Npp=Ni+No may be satisfied, and in the instant case, when the pole piece PP is fixed, a gear ratio Gr is determined as Gr=(−)No/Ni, and when the external rotor OR is fixed, the gear ratio Gr is determined as Gr=Npp/Ni.

In FIG. 3, a housing where the pole piece PP is fixed and a housing where the external rotor OR is fixed are divided, and when a vehicle of the present disclosure implements the EV mode, a first stage in a parallel mode, and a second stage in the parallel mode, a state of the coaxial magnetic gear device CMG is described.

Here, N and S mean magnetic poles formed by the internal rotor IR and the external rotor OR.

Figure 4:
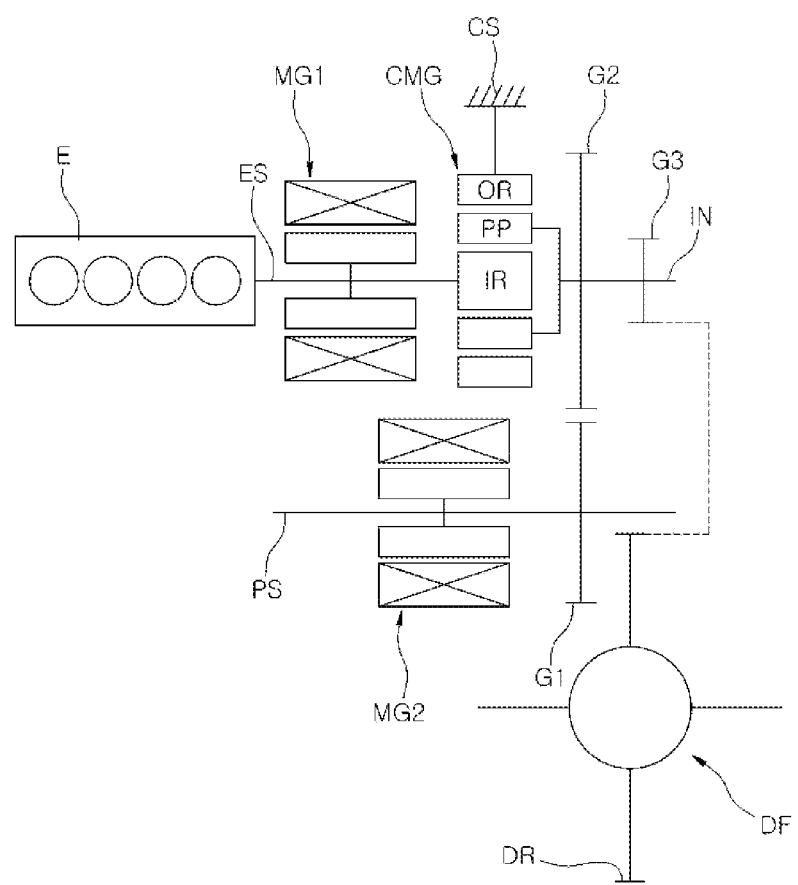
FIG. 4 is a diagram illustrating various exemplary embodiments of a hybrid powertrain of a vehicle according to the present disclosure.

Meanwhile, in the various exemplary embodiments of FIGS. 1, 4 and 6 in the present disclosure, the first motor MG1 has a structure which is directly connected to the engine rotation shaft ES.

Figure 5:
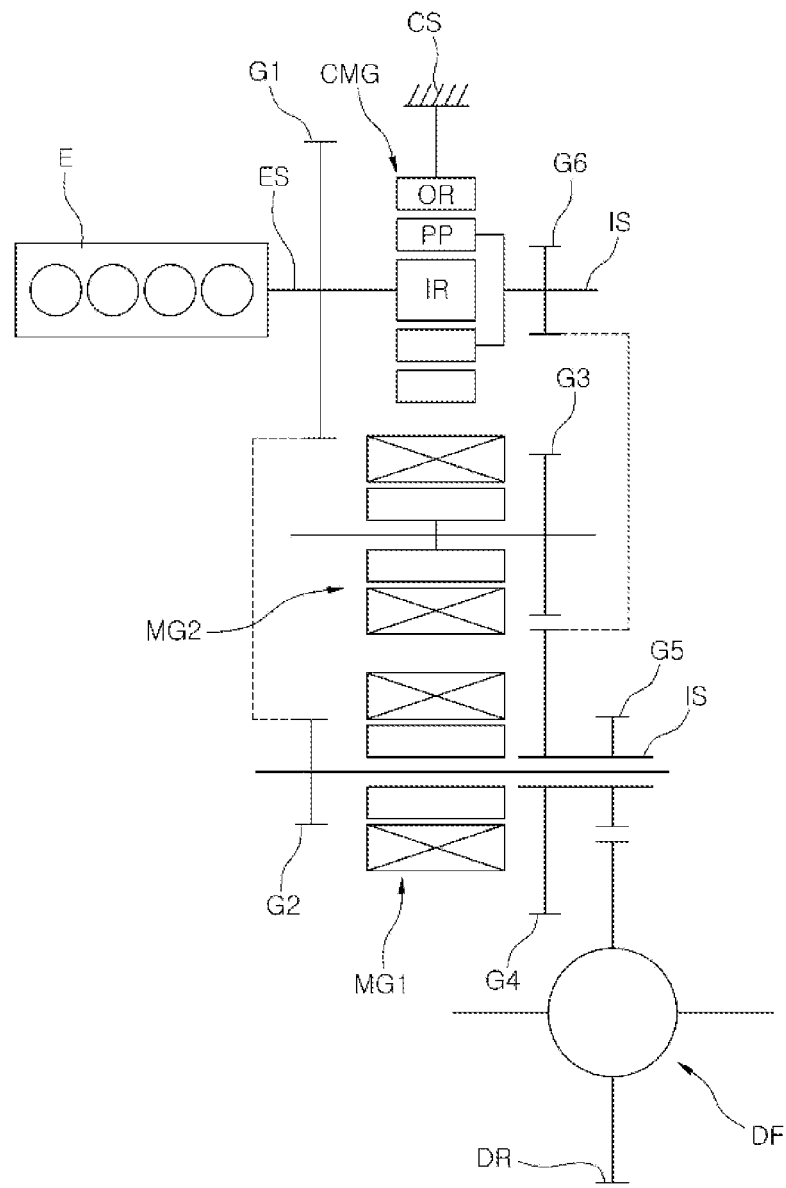
FIG. 5 is a diagram illustrating various exemplary embodiments of a hybrid powertrain of a vehicle according to the present disclosure.

Alternatively, in the various exemplary embodiments of FIGS. 5, 7 and 8 in the present disclosure, the first motor MG1 has a structure which is connected to the engine rotation shaft ES through an external gear pair.

Meanwhile, in all the exemplary embodiments of the present disclosure, a rotation shaft of the second motor MG2 is provided parallel to the input shaft IN, and the second motor MG2 has a structure which is connected to the differential device DF through one or more external gear pairs.

In the various exemplary embodiments of FIG. 1, the first motor MG1 is directly connected to the engine rotation shaft ES, a first gear G1 is provided on the rotation shaft of the second motor MG2, the input shaft IN is provided with a second gear G2 and a third gear G3 which are engaged with the first gear G1 to form an external gear pair, a through-shaft PS passing through the second motor MG2 is provided, and the through-shaft PS is provided with a fourth gear G4 engaged with the third gear G3 to form an external gear pair and a fifth gear G5 engaged with a ring gear DR of the differential device DF to form an external gear pair.

In an exemplary embodiment of the present disclosure, when the EV mode is implemented, because electricity for forming a magnetic pole is not supplied to the coaxial magnetic gear device CMG, the engine rotation shaft ES and the input shaft IN have a state of being mechanically blocked from each other. In the instant state, the power of the second motor MG2 sequentially passes through the first gear G1, the second gear G2, the third gear G3, the fourth gear G4, and the fifth gear G5 to drive the differential device DF.

Therefore, the differential device DF is driven only by the power of the second motor MG2 of the vehicle, and the engine E and the first motor MG1 do not form drag with respect to the driving of the vehicle.

In the present state, the engine E may be driven and the first motor MG1 may generate power using the power of the engine E to implement a series mode, and the electricity generated by the first motor MG1 may be charged in a battery or may be directly used to drive the second motor MG2.

When a parallel mode is implemented, electricity is supplied so that the coaxial magnetic gear device CMG becomes the first stage or the second stage of FIG. 3, and in a state in which the power of engine E is shifted and transmitted to the input shaft IN, the power of the second motor MG2 is additionally transmitted to the differential device DF.

Accordingly, the vehicle is driven by the power of the engine E and the power of the second motor MG2. In the instant case, the first motor MG1 may perform electric power generation or may be driven to assist a driving force of the vehicle.

Furthermore, as shown in FIG. 3, because a change of a gear ratio formed by the coaxial magnetic gear device CMG is performed by controlling the magnetic poles of the internal rotor IR and the external rotor OR of the coaxial magnetic gear device CMG, prompt and smooth shifting is possible.

In the various exemplary embodiments of FIG. 4, the first motor MG1 is directly connected to the engine rotation shaft ES, the first gear G1 is provided on the rotation shaft of the second motor MG2, and the input shaft IN is provided with the second gear G2 engaged with the first gear G1 to form an external gear pair and the third gear G3 engaged with the ring gear DR of the differential device DF to form an external gear pair.

That is, the power of the second motor MG2 is transmitted to the differential device DF through the first gear G1, the second gear G2, and the third gear G3.

In the various exemplary embodiments of FIG. 5, the first gear G1 is provided on the engine rotation shaft ES, the rotation shaft of the first motor MG1 is provided with the second gear G2 engaged with the first gear G1, the third gear G3 is provided on the rotation shaft of the second motor MG2, an intermediate shaft IS is provided concentric with the rotation shaft of the first motor MG1, and the intermediate shaft IS is provided with the fourth gear G4 engaged with the third gear G3 to form an external gear pair and the fifth gear G5 engaged with the ring gear DR of the differential device DF to form an external gear pair.

Furthermore, the input shaft IN is provided with a sixth gear G6 engaged with the fourth gear G4 of the intermediate shaft IS.

Accordingly, the power of the second motor MG2 is transmitted to the differential device DF through the third gear G3, the fourth gear G4, and the fifth gear G5, and the power of the input shaft IN is transmitted to the differential device DF through the sixth gear G6, the fourth gear G4, and the fifth gear G5.

In the various exemplary embodiments of FIG. 6, the first motor MG1 is directly connected to the engine rotation shaft ES, the first gear G1 is provided on the rotation shaft of the second motor MG2, and the input shaft IN is provided with the second gear G2 engaged with the first gear G1 to form an external gear pair and the third gear G3 engaged with the ring gear DR of the differential device DF to form an external gear pair.

Accordingly, the power of the second motor MG2 is transmitted to the differential device DF through the first gear G1, the second gear G2, and the third gear G3.

In the various exemplary embodiments of FIG. 7, the first gear G1 is provided on the engine rotation shaft ES, the rotation shaft of the first motor MG1 is provided with the second gear G2 engaged with the first gear G1, the rotation shaft of the second motor MG2 is provided with the third gear G3 engaged with the ring gear DR of the differential device DF to form an external gear pair, the fourth gear G4 is provided on the input shaft IN, and the rotation shaft of the second motor MG2 is provided with the fifth gear G5 engaged with the fourth gear G4.

Accordingly, the power of the second motor MG2 is directly transmitted to the differential device DF through the third gear G3, and the power of the input shaft IN is transmitted to the differential device DF through the fourth gear G4, the fifth gear G5, and the third gear G3.

In the various exemplary embodiments of FIG. 8, the first gear G1 is provided on the engine rotation shaft ES, the rotation shaft of the first motor MG1 is provided with the second gear G2 engaged with the first gear G1, the third gear G3 is provided on the rotation shaft of the second motor MG2, an intermediate shaft IS is provided concentric with the rotation shaft of the first motor MG1, and the intermediate shaft IS is provided with the fourth gear G4 engaged with the third gear G3 to form an external gear pair and the fifth gear G5 engaged with the ring gear DR of the differential device DF to form an external gear pair.

Furthermore, the input shaft IN is provided with the sixth gear G6 engaged with the ring gear DR of the differential device DF.

Accordingly, the power of the second motor MG2 is transmitted to the differential device DF through the third gear G3, the fourth gear G4, and the fifth gear G5, and the power of the input shaft IN is directly transmitted to the differential device DF through the sixth gear G6.

As described above, the operations of the second to various exemplary embodiments of FIG. 8 in the present disclosure are almost similar to the operation of the various exemplary embodiments of FIG. 1 in the present disclosure, and thus detailed descriptions thereof will be omitted herein.

For reference, in the above embodiments of the present disclosure, the first gear G1 to the sixth gear G6 are merely named to distinguish a plurality of gears from each other in various exemplary embodiments and do not mean that the first gear G1 to the sixth gear G6 are identical to each other or perform the same function.

In accordance with a hybrid powertrain of a vehicle, various driving modes may be implemented with a simple configuration and an efficient vehicle driving may be achieved by minimizing drag so that it is possible to further improve fuel efficiency of the vehicle.

When an electric vehicle (EV) mode or a series mode is implemented, an engine is mechanically separated from a differential device, and thus it is advantageous for fuel efficiency and is configured for performing a gear shifting so that, when compared with implementation of a parallel mode, it is possible to improve fuel efficiency by securing a more advantageous engine operating point and reducing drag of a motor.

Furthermore, because a gear shifting is electrically controlled, it is possible to prompt a gear shifting and improve a shift feeling.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A hybrid powertrain of a vehicle, the hybrid powertrain comprising:
    an input shaft provided concentric with an engine rotation shaft;
    a coaxial magnetic gear device provided to connect the engine rotation shaft to the input shaft;
    a differential device continuously engaged to the input shaft;
    a first motor continuously engaged to the engine rotation shaft; and
    a second motor continuously engaged to the differential device,
    wherein the coaxial magnetic gear device includes a first rotation element, a second rotation element and a third rotation element,
    wherein the first rotation element is stationary, the second rotation element is connected to the engine rotation shaft, and the third rotation element is connected to the input shaft,
    wherein a rotation shaft of the second motor is provided parallel to the input shaft, and
    wherein the second motor is coupled to the differential device through one or more external gear pairs.

2. The hybrid powertrain of claim 1, wherein the first motor is directly connected to the engine rotation shaft.

3. The hybrid powertrain of claim 1, wherein the first motor is connected to the engine rotation shaft through an external gear pair.

4. The hybrid powertrain of claim 1,
wherein the first motor is directly connected to the engine rotation shaft,
wherein a first gear is fixedly provided on a rotation shaft of the second motor, and
wherein the input shaft is provided with a second gear engaged with the first gear to form an external gear pair and a third gear engaged with a ring gear of the differential device to form an external gear pair.

5. The hybrid powertrain of claim 1,
wherein a first gear is provided on the engine rotation shaft,
wherein a rotation shaft of the first motor is provided with a second gear engaged with the first gear,
wherein a third gear is provided on a rotation shaft of the second motor,
wherein an intermediate shaft is rotatably provided on the rotation shaft of the first motor, and
wherein the intermediate shaft is provided with a fourth gear engaged with the third gear to form an external gear pair and a fifth gear engaged with a ring gear of the differential device to form an external gear pair.

6. The hybrid powertrain of claim 5, wherein the input shaft is further provided with a sixth gear engaged with the fourth gear of the intermediate shaft.

7. The hybrid powertrain of claim 1,
wherein the first rotation element is an pole piece, the second rotation element is an internal rotor and the third rotation element is an external rotor, and
wherein the pole piece is fixed to a housing.

8. The hybrid powertrain of claim 7,
wherein the first motor is directly connected to the engine rotation shaft,
wherein a first gear is fixedly provided on a rotation shaft of the second motor, and
wherein the input shaft is provided with a second gear engaged with the first gear to form an external gear pair and a third gear engaged with a ring gear of the differential device to form an external gear pair.

9. The hybrid powertrain of claim 7,
wherein a first gear is provided on the engine rotation shaft,
wherein a rotation shaft of the first motor is provided with a second gear engaged with the first gear,
wherein a rotation shaft of the second motor is provided with a third gear engaged with a ring gear of the differential device to form an external gear pair;
wherein a fourth gear is provided on the input shaft, and
wherein the rotation shaft of the second motor is provided with a fifth gear engaged with the fourth gear.

10. The hybrid powertrain of claim 7,
wherein a first gear is provided on the engine rotation shaft,
wherein a rotation shaft of the first motor is provided with a second gear engaged with the first gear,
wherein a third gear is provided on a rotation shaft of the second motor,
wherein an intermediate shaft is rotatably provided on the rotation shaft of the first motor, and
wherein the intermediate shaft is provided with a fourth gear engaged with the third gear to form an external gear pair and a fifth gear engaged with a ring gear of the differential device to form an external gear pair.

11. The hybrid powertrain of claim 10, wherein the input shaft is further provided with a sixth gear engaged with the ring gear of the differential device.

12. A hybrid powertrain of a vehicle, the hybrid powertrain comprising:
an input shaft provided concentric with an engine rotation shaft;
a coaxial magnetic gear device provided to connect the engine rotation shaft to the input shaft;
a differential device continuously engaged to the input shaft;
a first motor continuously engaged to the engine rotation shaft; and
a second motor continuously engaged to the differential device,
wherein the coaxial magnetic gear device includes a first rotation element, a second rotation element and a third rotation element,
wherein the first rotation element is stationary, the second rotation element is connected to the engine rotation shaft, and the third rotation element is connected to the input shaft,
wherein the first rotation element is an external rotor, the second rotation element is an internal rotor and the third rotation element is a pole piece,
wherein the external rotor is fixed to a housing,
wherein the first motor is directly connected to the engine rotation shaft,
wherein a first gear is fixedly provided on a rotation shaft of the second motor,
wherein the input shaft is provided with a second gear and a third gear, the second gear being engaged with the first gear to form an external gear pair,
wherein a through-shaft passing through the rotation shaft of the second motor is provided, and
wherein the through-shaft is provided with a fourth gear engaged with the third gear to form an external gear pair and a fifth gear engaged with a ring gear of the differential device to form an external gear pair.

* * * * *